United States Patent
Xian et al.

(10) Patent No.: US 12,007,919 B2
(45) Date of Patent: Jun. 11, 2024

(54) IN-VEHICLE COMMUNICATION DEVICE AND VEHICLE COMMUNICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuanjun Xian, Yokkaichi (JP); Takeshi Hagihara, Yokkaichi (JP); Makoto Mashita, Yokkaichi (JP); Nobuyuki Kobayashi, Yokkaichi (JP); Takehiro Kawauchi, Osaka (JP); Tatsuya Izumi, Osaka (JP); Akihito Iwata, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industires, Ltd., Osaka (JP)

( * ) Notice: Subject to any disclaimer, the term of this patent is extended or adjusted under 35 U.S.C. 154(b) by 40 days.

(21) Appl. No.: 17/755,513

(22) PCT Filed: Aug. 13, 2020

(86) PCT No.: PCT/JP2020/030769
§ 371 (c)(1),
(2) Date: Apr. 29, 2022

(87) PCT Pub. No.: WO2021/084845
PCT Pub. Date: May 6, 2021

(65) Prior Publication Data
US 2022/0374372 A1 Nov. 24, 2022

(30) Foreign Application Priority Data
Oct. 31, 2019 (JP) .................. 2019-199093

(51) Int. Cl.
*G06F 13/26* (2006.01)
*G06F 13/24* (2006.01)
(Continued)

(52) U.S. Cl.
CPC .............. *G06F 13/24* (2013.01); *H04W 4/48* (2018.02); *H04L 49/351* (2013.01)

(58) Field of Classification Search
CPC ....... G06F 13/24; H04W 4/48; H04W 28/065; H04L 49/351; H04L 9/40
See application file for complete search history.

(56) References Cited

U.S. PATENT DOCUMENTS

2003/0061426 A1* 3/2003 Connor ................... H04L 47/29
710/265
2005/0131987 A1* 6/2005 Chen ................... H04L 49/3018
709/201

(Continued)

FOREIGN PATENT DOCUMENTS

JP 2003-273867 A 9/2003
JP 2006-197176 A 7/2006
(Continued)

OTHER PUBLICATIONS

International Search Report, Application No. PCT/JP2020/030769, dated Oct. 27, 2020. ISA/Japan Patent Office.

*Primary Examiner* — Henry Tsai
*Assistant Examiner* — Kim T Huynh
(74) *Attorney, Agent, or Firm* — Honigman LLP

(57) ABSTRACT

An in-vehicle communication device for transmitting and receiving a signal by a predetermined communication protocol related to Ethernet® (registered trademark), the in-vehicle communication device comprising: a control circuit configured to generate transmission data including interrupt data inserted into an inter-frame gap between Ethernet (Continued)

frames; and a PHY unit having a communication circuit configured to convert the transmission data generated by the control circuit into a signal and transmit the signal.

8 Claims, 4 Drawing Sheets

(51) Int. Cl.
    *H04W 4/48*     (2018.01)
    *H04L 49/351*     (2022.01)

(56) References Cited

U.S. PATENT DOCUMENTS

| | | | |
|---|---|---|---|
| 2010/0172248 A1 | 7/2010 | Shiraishi | |
| 2015/0078383 A1* | 3/2015 | Wisehart | H04L 49/552 370/392 |
| 2018/0101494 A1* | 4/2018 | Davis | G06F 13/105 |
| 2018/0262896 A1 | 9/2018 | Manabe | |
| 2020/0052773 A1* | 2/2020 | Go | H04L 67/12 |
| 2020/0172028 A1 | 6/2020 | Kawauchi et al. | |
| 2020/0304340 A1 | 9/2020 | Itoda | |
| 2021/0120524 A1* | 4/2021 | Palle | H04W 68/005 |

FOREIGN PATENT DOCUMENTS

| | | | |
|---|---|---|---|
| JP | 2012-222611 A | 11/2012 | |
| JP | 2019-004215 A | 1/2019 | |

\* cited by examiner

IN-VEHICLE COMMUNICATION DEVICE AND VEHICLE COMMUNICATION METHOD

CROSS-REFERENCE TO RELATED APPLICATIONS

This application is the U.S. national stage of PCT/JP2020/030769 filed on Aug. 13, 2020, which claims priority of Japanese Patent Application No. JP 2019-199093 filed on Oct. 31, 2019, the contents of which are incorporated herein.

TECHNICAL FIELD

The present disclosure relates to an in-vehicle communication device and a vehicle communication method.

BACKGROUND

In recent years, in-vehicle Ethernet® has been attracting attention. An in-vehicle communication device that performs Ethernet communication includes a PHY unit that transmits and receives signals via a port. The PHY unit compliant with 100BaseT1 (IEEE802.3bw) transmits and receives signals by providing a 96-bit inter-frame gap (IFG) between Ethernet frames, as in the case of conventional Ethernet.

In the inter-frame gap, there is a problem that information is not transmitted or received, and a band of 100 Mbps cannot be fully utilized.

SUMMARY

An object of the present disclosure is to provide an in-vehicle communication device and a vehicle communication method allowing communication utilizing an inter-frame gap while ensuring a predetermined communication band by transmitting and receiving information using an inter-frame gap region.

An in-vehicle communication device of the present disclosure is the in-vehicle communication device for transmitting and receiving a signal by a predetermined communication protocol related to Ethernet®, the in-vehicle communication device comprising: a control circuit configured to generate transmission data including interrupt data inserted into an inter-frame gap between Ethernet frames; and a PHY unit having a communication circuit configured to convert the transmission data generated by the control circuit into a signal and transmit the signal.

A vehicle communication method of the present disclosure is the vehicle communication method using an in-vehicle communication device for transmitting and receiving a signal by a predetermined communication protocol related to Ethernet®, the vehicle communication method comprising: generating transmission data including interrupt data inserted into an inter-frame gap between Ethernet frames; and converting the generated transmission data into a signal and transmitting the signal.

Note that this application can be realized not only as an in-vehicle communication device including such a characteristic processing unit, but also as a vehicle communication method in which such characteristic processing is a step as described above or as a program for causing a computer to execute such a step. In addition, this application can be realized as a semiconductor integrated circuit that realizes a part of or the entire in-vehicle communication device, or as another system including the in-vehicle communication device.

Advantageous Effects

According to the present disclosure, it is possible to provide an in-vehicle communication device and a vehicle communication method allowing communication utilizing an inter-frame gap while ensuring a predetermined communication band by transmitting and receiving information using an inter-frame gap region.

DETAILED DESCRIPTION OF PREFERRED EMBODIMENTS

Figure 1:
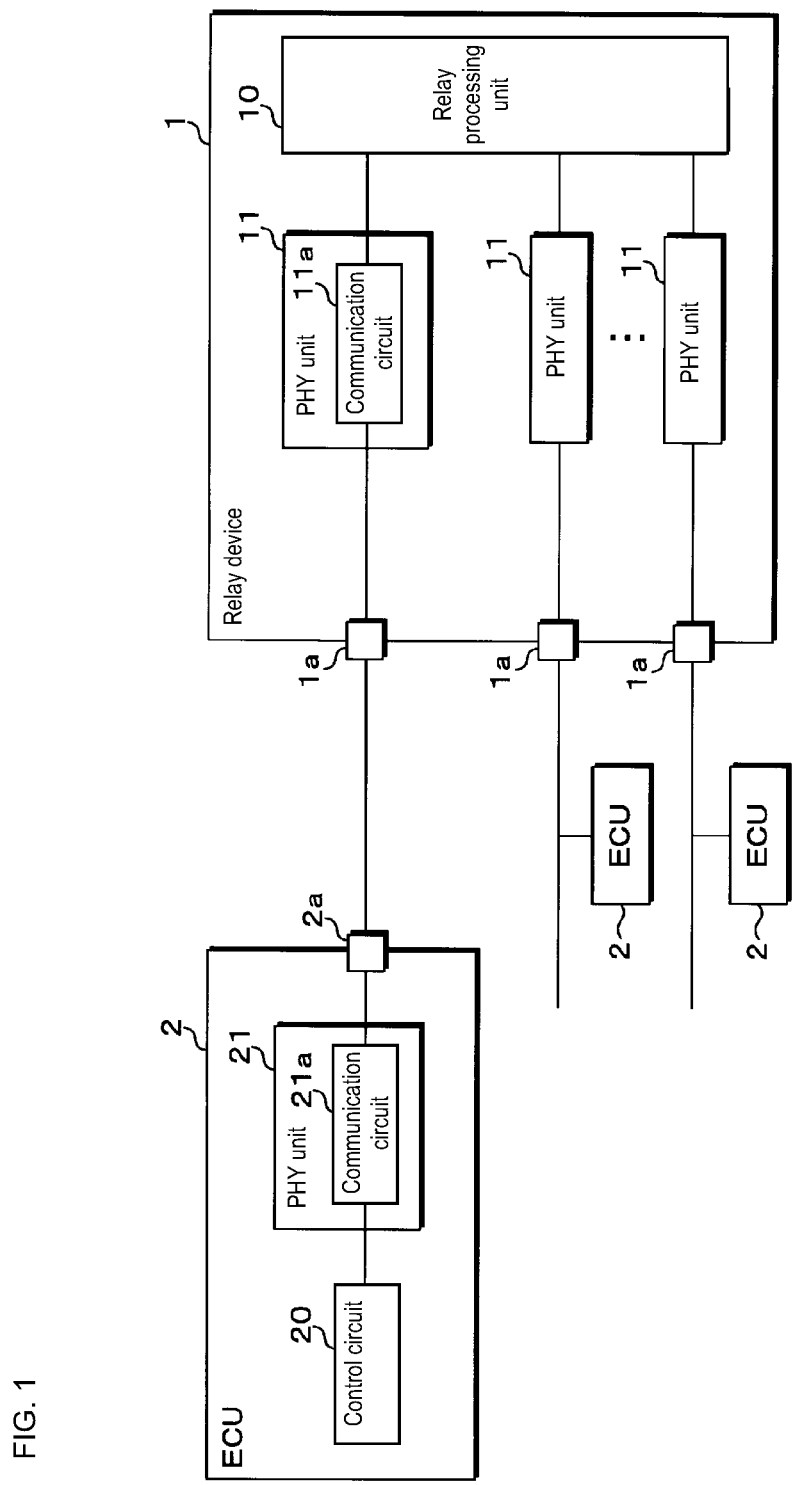
FIG. 1 is a block diagram illustrating a configuration example of an in-vehicle communication system.

First, embodiments of the disclosure will be listed and described. In addition, at least a part of the embodiments described below may be arbitrarily combined.

An in-vehicle communication device of the present aspect is the in-vehicle communication device for transmitting and receiving a signal by a predetermined communication protocol related to Ethernet®), the in-vehicle communication device comprising: a control circuit configured to generate transmission data including interrupt data inserted into an inter-frame gap between Ethernet frames; and a PHY unit having a communication circuit configured to convert the transmission data generated by the control circuit into a signal and transmit the signal.

According to this aspect, the PHY unit of the in-vehicle communication device transmits and receives a signal by a predetermined communication protocol related to Ethernet. An inter-frame gap is provided between Ethernet frames transmitted and received by the PHY unit. The PHY unit can insert interrupt data into the inter-frame gap and transmit a signal.

Therefore, by transmitting and receiving information using the inter-frame gap region, it is possible to perform communication utilizing an inter-frame gap while ensuring a predetermined communication band.

It is preferable that the interrupt data is data of 96 bits or less.

According to this aspect, the PHY unit can insert interrupt data of 96 bits or less into a minimum 96-bit region ensured as an inter-frame gap and transmit a signal.

Note that when the size of the Ethernet frame is the maximum, the inter-frame gap region is 96 bits. However, when the size of the Ethernet frame is not the maximum, a larger inter-frame gap is ensured. Further, even when the inter-frame gap disappears several times due to insertion of interrupt data, link-down does not occur, and thus a possibility that communication is suspended due to insertion of interrupt data can be ignored.

It is preferable that the interrupt data includes data indicating start of interrupt and data for error detection.

According to this aspect, the interrupt data includes data indicating start of interrupt, data of a main body of the interrupt data, and data for error detection. The in-vehicle communication device at the destination can recognize the interrupt data by the data indicating the start of the interrupt, and detect or correct an error in data of the main body of the interrupt data by using the data for error detection.

It is preferable that the predetermined communication protocol is 100Base-T1.

According to this aspect, the in-vehicle communication device can perform communication utilizing an inter-frame gap while ensuring a communication band of 100 Mbps in communication compliant with 100Base-T1.

It is preferable that the interrupt data includes information indicating a state of the PHY unit.

According to this aspect, the in-vehicle communication device can transmit information indicating the state of the PHY unit as interrupt data.

It is preferable that the interrupt data includes information indicating a state of an operating application program According to this aspect, the in-vehicle communication device can transmit information indicating the state of the operating application program as interrupt data.

It is preferable that information for managing relay of the Ethernet frame contained in the transmission data is included.

According to this aspect, the in-vehicle communication device can transmit information for managing relay of the Ethernet frame as interrupt data. For example, the in-vehicle communication device can transmit, as interrupt data, a priority when relaying the Ethernet frame to another in-vehicle communication device, that is, information for determining whether or not the Ethernet frame needs to be relayed before another Ethernet frame.

A vehicle communication method of the present aspect is the vehicle communication method using an in-vehicle communication device for transmitting and receiving a signal by a predetermined communication protocol related to Ethernet®, the vehicle communication method comprising: generating transmission data including interrupt data inserted into an inter-frame gap between Ethernet frames; and converting the generated transmission data into a signal and transmitting the signal.

According to this aspect, as in the first aspect, by transmitting and receiving information using the inter-frame gap region, it is possible to perform communication utilizing the inter-frame gap while ensuring a predetermined communication band.

Note that this application can be realized not only as an in-vehicle communication device including such a characteristic processing unit, but also as a vehicle communication method in which such characteristic processing is a step as described above or as a program for causing a computer to execute such a step. In addition, this application can be realized as a semiconductor integrated circuit that realizes a part of or the entire in-vehicle communication device, or as another system including the in-vehicle communication device.

An in-vehicle communication system according to embodiments of the disclosure will be described below with reference to the drawings. Note that the invention is not limited to these examples, is indicated by the scope of claims, and is intended to include equivalents of the claims and all modifications within the scope.

Hereinafter, the disclosure will be specifically described with reference to the drawings illustrating the embodiments thereof.

FIG. 1 is a block diagram illustrating a configuration example of an in-vehicle communication system.

The in-vehicle communication system according to the present embodiment includes a relay device 1 mounted on a vehicle and a plurality of ECUs (Electronic Control Units) 2. The plurality of ECUs 2 is connected to the relay device 1 by an in-vehicle communication line to form an in-vehicle Ethernet. Note that the in-vehicle communication system may be configured to perform CAN communication together with Ethernet communication.

The relay device 1 includes a relay processing unit 10, a plurality of ports 1a, and a plurality of PHY units 11 transmitting and receiving signals via each of the ports 1a. The relay device 1 is an in-vehicle communication device that performs communication compliant with 100BaseT1 (IEEE802.3bw), and functions as, for example, a slave.

The PHY unit 11 includes a communication circuit 11a. Since configurations of the plurality of PHY units 11 included in the relay device 1 are the same, a configuration of one PHY unit 11 will be described below, and the detailed description of the other PHY units 11 will be omitted.

The communication circuit 11a includes a transmission circuit and a reception circuit functioning as a transceiver that performs communication compliant with the communication protocol of 100Base-T1. The transmission circuit converts transmission data given from the relay processing unit 10 into a three-level signal and outputs the converted three-level signal to the port 1a. The signal is transmitted to the ECU 2 connected to the port 1a via the port 1a. Further, the transmission circuit converts the signal transmitted from the ECU 2 and input to the port 1a into reception data, and gives the converted reception data to the relay processing unit 10.

The plurality of ECUs 2 is connected to the relay processing unit 10 to have functions as an Ethernet switch and an L2 switch for relaying transmission data and reception data. The relay processing unit 10 includes, for example, a microcomputer, a storage unit, an input/output interface to which the PHY unit 11 is connected, a timekeeping unit, etc. (not illustrated), and executes relay processing of transmission data.

The ECU 2 includes a control circuit 20, a port 2a, and a PHY unit 21 for transmitting and receiving signals via the port 2a. The ECU 2 is an in-vehicle communication device that performs communication compliant with 100BaseT1 (IEEE802.3bw), and functions as, for example, a master.

The PHY unit 21 includes the communication circuit 21a. The communication circuit 21a includes a transmission circuit and a reception circuit functioning as a transceiver that performs communication compliant with the communication protocol of 100Base-T1. The transmission circuit converts transmission data given from the control circuit 20 into a three-level signal and outputs the converted three-level signal to the port 2a. The signal is transmitted to another ECU 2 through the relay device 1 connected to the port 2a. Further, the transmission circuit converts a signal transmitted from another ECU 2 via the relay device 1 and input to the port 2a into reception data, and gives the converted reception data to the control circuit 20.

The control circuit 20 includes, for example, a microcomputer, a storage unit, an input/output interface to which the PHY unit 11 is connected, a timekeeping unit, etc. (not illustrated). The control circuit 20 generates transmission data having an Ethernet frame and gives the generated transmission data to the PHY unit 21, thereby transmitting the transmission data.

Figure 2:
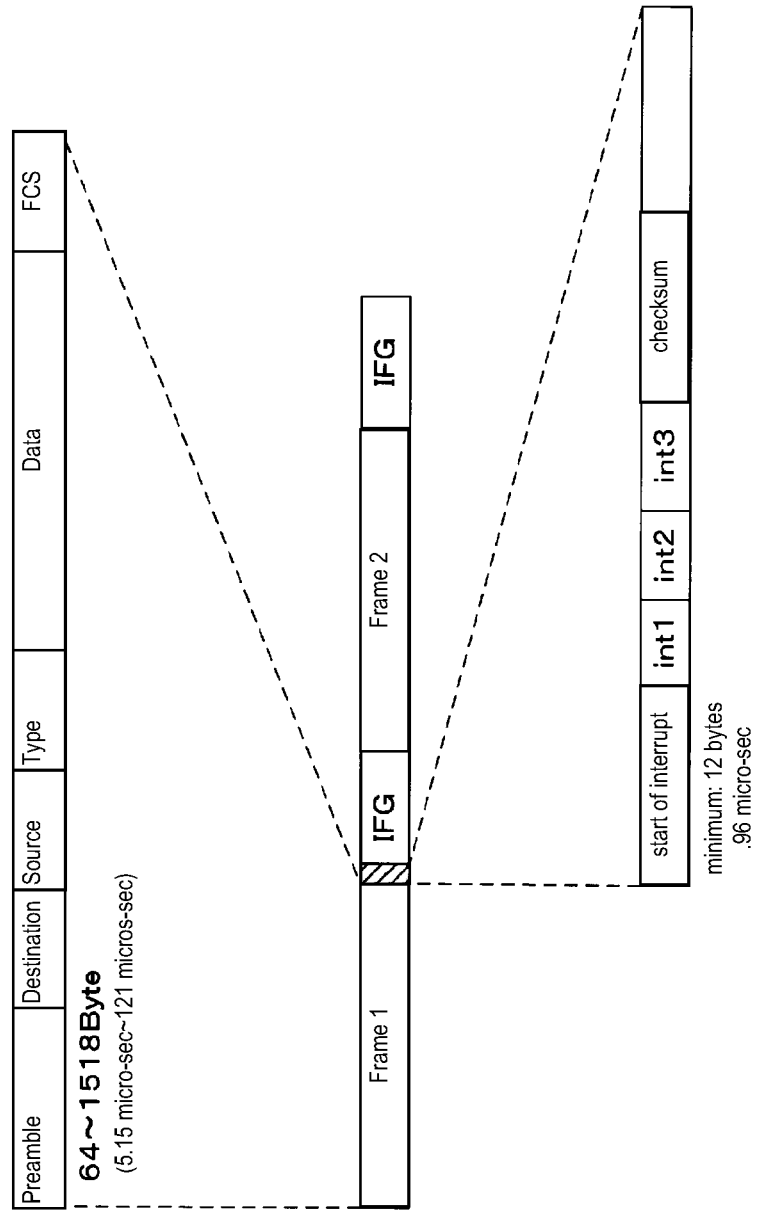
FIG. 2 is a schematic diagram illustrating an Ethernet frame and interrupt information.

FIG. 2 is a schematic diagram illustrating an Ethernet frame and interrupt information. As illustrated in FIG. 2, the control circuit 20 transmits data to be transmitted from the PHY unit 21 as an Ethernet frame which is a communication unit. The Ethernet frame includes a preamble, a destination, a source, a type, data, and an FCS (frame check code). A data size of the Ethernet frame is 64 to 1518 bytes. When a communication frequency is 100 Mbps, one Ethernet frame corresponds to data transmitted in 5.15 µs to 121 µs. An inter-frame gap (IFG) is provided between adjacent Ethernet frames.

The minimum size of the inter-frame gap is 12 bytes. The minimum inter-frame gap corresponds to 0.96 µsec. Normally, information is not transmitted or received in the inter-frame gap.

The control circuit 20 according to the present embodiment generates transmission data including interrupt data inserted into the inter-frame gap. The interrupt data includes data indicating the start of interrupt, data int1, data int2, data int3, etc., which are main bodies of the interrupt data, and data for error detection. A size of the interrupt data is 96 bits or less.

Then, after giving data of the Ethernet frame to the PHY unit 21, the control circuit 20 gives the interrupt data to the PHY unit 21 so that the interrupt data is inserted into the inter-frame gap. As illustrated in FIG. 2, the PHY unit 21 transmits transmission data in which the interrupt data is inserted into the inter-frame gap. When the size of the inter-frame gap is smaller than that of the interrupt data, the PHY unit 21 transmits a predetermined signal similarly to a normal inter-frame gap after transmission of the interrupt data until transmission of a next Ethernet frame.

Any data can be inserted as interrupt data.

For example, the control circuit 20 may generate information indicating a state of the PHY unit 21 as interrupt data. The control circuit 20 may generate information indicating a state of an operating application program (hereinafter referred to as application state information) as interrupt data. The application state information is, for example, information indicating whether or not the application is operating normally.

The control circuit 20 may transmit information for managing relay of the Ethernet frame as interrupt data. For example, the control circuit 20 may generate, as interrupt data, a priority when relaying the Ethernet frame to another ECU, that is, information for determining whether or not the Ethernet frame needs to be relayed before another Ethernet frame.

Note that a function of the ECU 2 described above is not particularly limited, and includes the following.

An ECU 2 belonging to a cognitive domain is connected to, for example, a sensor such as an in-vehicle camera, LIDAR, an ultrasonic sensor, or a millimeter wave sensor. The ECU 2 digitally converts an output value output from the sensor, for example, and transmits the output value to an ECU 2 of a determination system domain via the relay device 1. The ECU 2 belonging to the determination system domain receives, for example, data transmitted from the ECU 2 belonging to the cognitive system domain. Based on the received data, the ECU 2 of the determination system domain generates data for exhibiting an automatic driving function of a vehicle, or performs a process of processing the data. The ECU 2 of the determination system domain transmits the generated data to an ECU 2 of an operation system domain via the relay device 1.

The ECU 2 belonging to the operation system domain is connected to, for example, an actuator such as a motor, an engine, or a brake. The ECU 2 of the operation system domain receives data transmitted from the ECU 2 of the determination system domain, controls an operation of the actuator based on the received data to perform an operation such as running, stopping, or steering the vehicle, and exhibits the automatic driving function.

Figure 3:
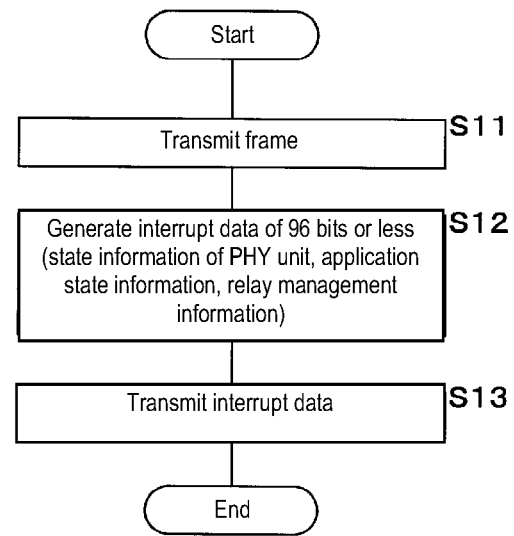
FIG. 3 is a flowchart illustrating a method of transmitting the Ethernet frame and the interrupt information.

FIG. 3 is a flowchart illustrating a method of transmitting the Ethernet frame and the interrupt information. Here, a description is given of an example in which the control circuit 20 of the ECU transmits interrupt data. The control circuit 20 of the ECU generates Ethernet frame data based on data to be transmitted and gives the generated Ethernet frame data to the PHY unit 21, thereby transmitting the Ethernet frame data (step S11).

The control circuit 20 generates interrupt data of 96 bits or less as needed (step S12). For example, as described above, the control circuit 20 generates interrupt data including state information, application state information, relay management information, etc. of the PHY unit 21. Subsequently, the control circuit 20 inserts the generated interrupt data into the inter-frame gap and transmits the interrupt data (step S13).

Hereinafter, the control circuit 20 transmits transmission data by repeatedly executing the same process.

The ECU 2 on the receiving side, for example, the relay device 1, extracts the interrupt data inserted in the inter-frame gap and executes a predetermined process using the extracted interrupt data. The relay processing unit 10 of the relay device 1 can extract the interrupt data from the received data based on interrupt start data.

Figure 4:
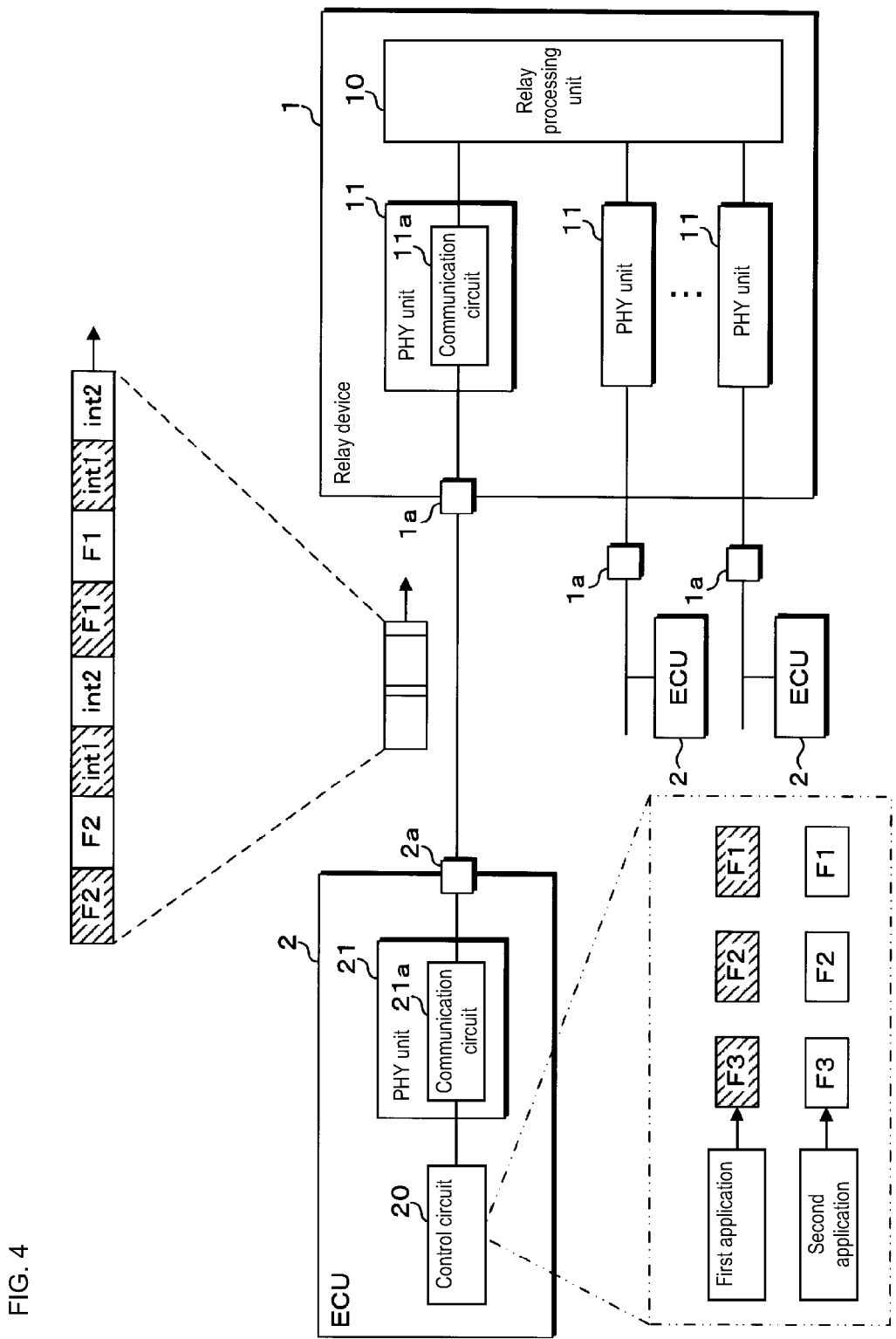
FIG. 4 is a schematic diagram illustrating a method of transmitting data related to an application program.

FIG. 4 is a schematic diagram illustrating a method of transmitting data related to an application program. In the example illustrated in FIG. 4, the control circuit 20 of the ECU 2 operates a first application and a second application. The control circuit 20 transmits data generated by execution of the first application and the second application from the PHY unit 21 to the relay device 1 in the form of an Ethernet frame. Hatched "F1", "F2", and "F3" blocks indicate data generated by the first application. White blocks "F1", "F2", and "F3" indicate data generated by the second application.

Further, the control circuit 20 transmits interrupt information of the first application and the second application, for example, information indicating life and death of an application as interrupt data, if necessary. Hatched "int1" and "int2" indicate the interrupt information of the first application, and white "int1" and "int2" indicate the interrupt information of the second application.

The relay processing unit 10 can receive data generated by the first application and the second application in the Ethernet frame, and can receive interruption information of the first application and the second application. In this way, the ECU 2 can transmit interrupt information such as life-and-death information of the application to the relay device 1 without squeezing a communication band. The relay device 1 can constantly monitor the life-and-death information of the ECU.

Note that in the present embodiment, an example in which the ECU 2 mainly transmits interrupt data has been described. However, naturally, the relay device 1 may be configured to transmit interrupt data when transmitting transmission data. Further, when interrupt data transmitted from one ECU is transmitted to another ECU, the interrupt data may be relayed using an inter-frame gap in the same manner.

According to the embodiment configured in this way, by transmitting and receiving information using the inter-frame gap region, it is possible to perform communication utilizing the inter-frame gap while ensuring a predetermined communication band.

The relay device 1 and the ECU 2 can insert interrupt data of 96 bits or less into the minimum 96-bit region ensured as an inter-frame gap and transmit a signal. The interrupt data can be transmitted while ensuring transmission of an Ethernet frame. When the inter-frame gap is not transmitted or received for about 200 ms, link-down may occur. However, even when the inter-frame gap disappears several times continuously, communication is not suspended and the effect can be ignored. Note that the control circuit 20 may be configured to monitor disappearance of the inter-frame gap and suspend transmission of interrupt data when the inter-frame gap disappears continuously for a predetermined time of less than 200 ms.

The relay device 1 and the ECU 2 can transmit state information, application state information, relay management information, etc. indicating the state of the PHY unit 21 as interrupt data. In particular, when the relay management information is transmitted as interrupt data, a priority of relay or transmission of an Ethernet frame can be dynamically adjusted.

The invention claimed is:

1. An in-vehicle communication device for transmitting and receiving a signal by a predetermined communication protocol related to Ethernet®, the in-vehicle communication device comprising:
   a control circuit configured to generate transmission data including at least two Ethernet frames and interrupt data inserted into an inter-frame gap between the at least two Ethernet frames, the inter-frame gap being a gap between a transmission of the at least two Ethernet frames; and
   a PHY unit having a communication circuit configured to convert the transmission data generated by the control circuit into a signal for transmission along a bus and transmit the signal along the bus,
   wherein the interrupt data includes information for managing relay of the Ethernet frames included in the transmission data, and the information includes a priority for determining whether or not to relay the Ethernet frames before another Ethernet frame when relaying the Ethernet frames to another in-vehicle communication device via a relay device.

2. The in-vehicle communication device according to claim 1, wherein the interrupt data is data of 96 bits or less.

3. The in-vehicle communication device according to claim 1, wherein the interrupt data includes data indicating start of interrupt and data for error detection.

4. The in-vehicle communication device according to claim 1, wherein the predetermined communication protocol is 100Base-T1.

5. The in-vehicle communication device according to claim 1, wherein the interrupt data includes information indicating a state of the PHY unit.

6. The in-vehicle communication device according to claim 1, wherein the Ethernet frame includes data generated by a first application program and data generated by a second application program, and
   the interrupt data includes information indicating life and death of the operating first application program and the operating second application program.

7. The in-vehicle communication device according to claim 1, wherein information for managing relay of the Ethernet frame contained in the transmission data is included.

8. A vehicle communication method using an in-vehicle communication device for transmitting and receiving a signal by a predetermined communication protocol related to Ethernet®, the vehicle communication method comprising:
   generating transmission data including at least two Ethernet frames and interrupt data inserted into an inter-frame gap between the at least two Ethernet frames, the inter-frame gap being a gap between a transmission of the at least two Ethernet frames, the interrupt data including information for managing relay of the Ethernet frames included in the transmission data, and the information including a priority for determining whether or not to relay the Ethernet frames before another Ethernet frame when relaying the Ethernet frames to another in-vehicle communication device via a relay device; and
   converting the generated transmission data into a signal for transmission along a bus and transmitting the signal along the bus.

* * * * *